Patented June 1, 1948

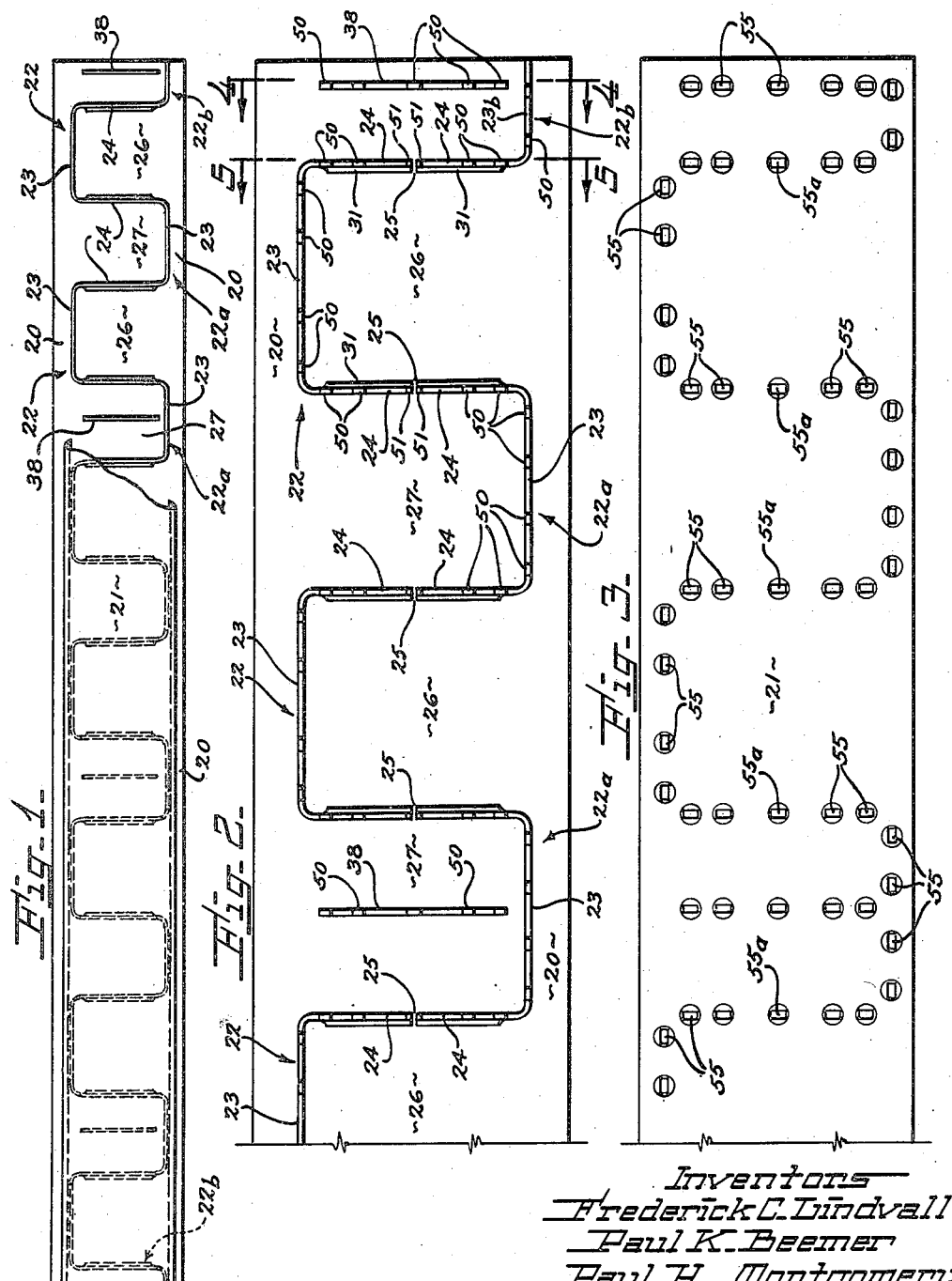

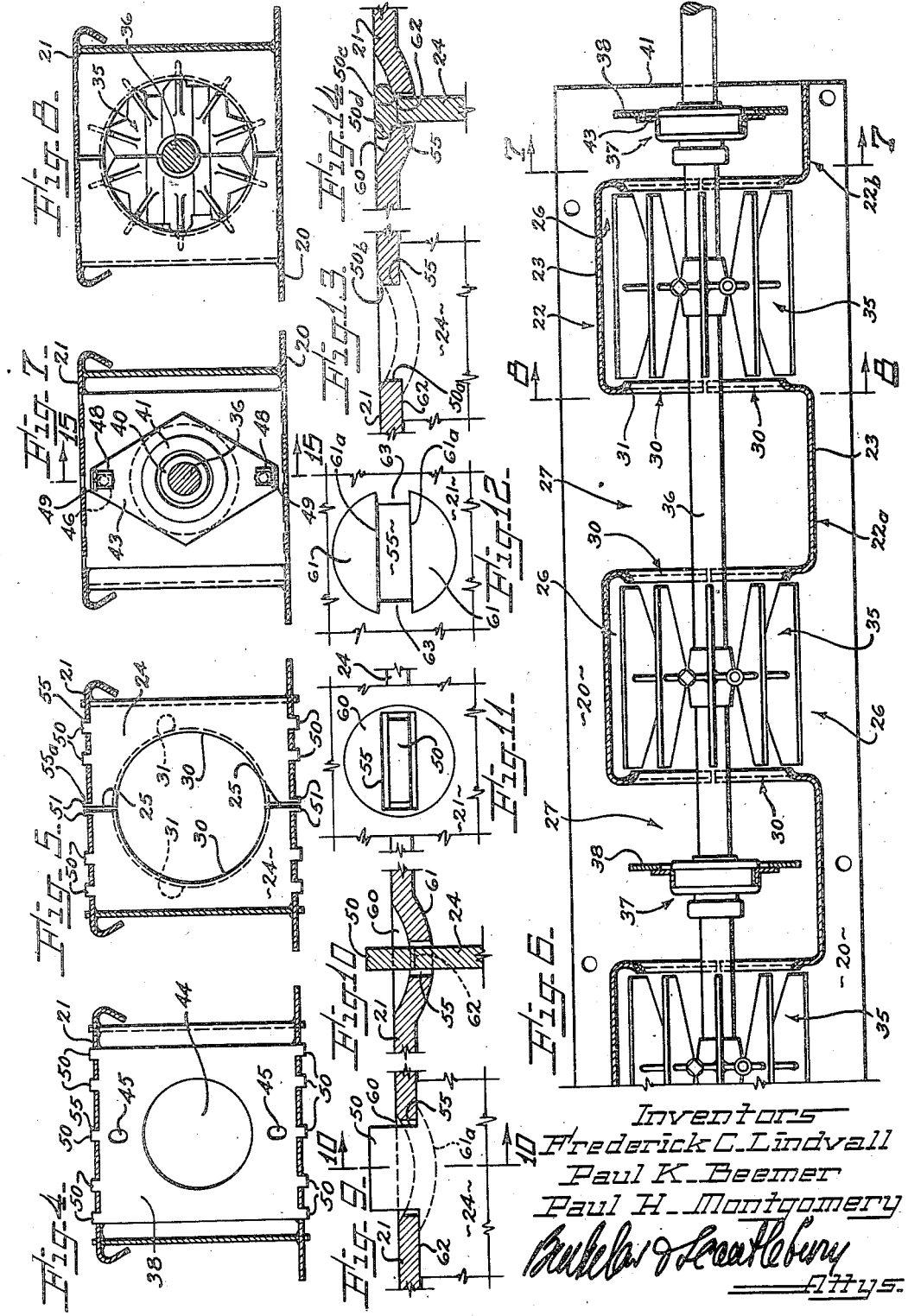

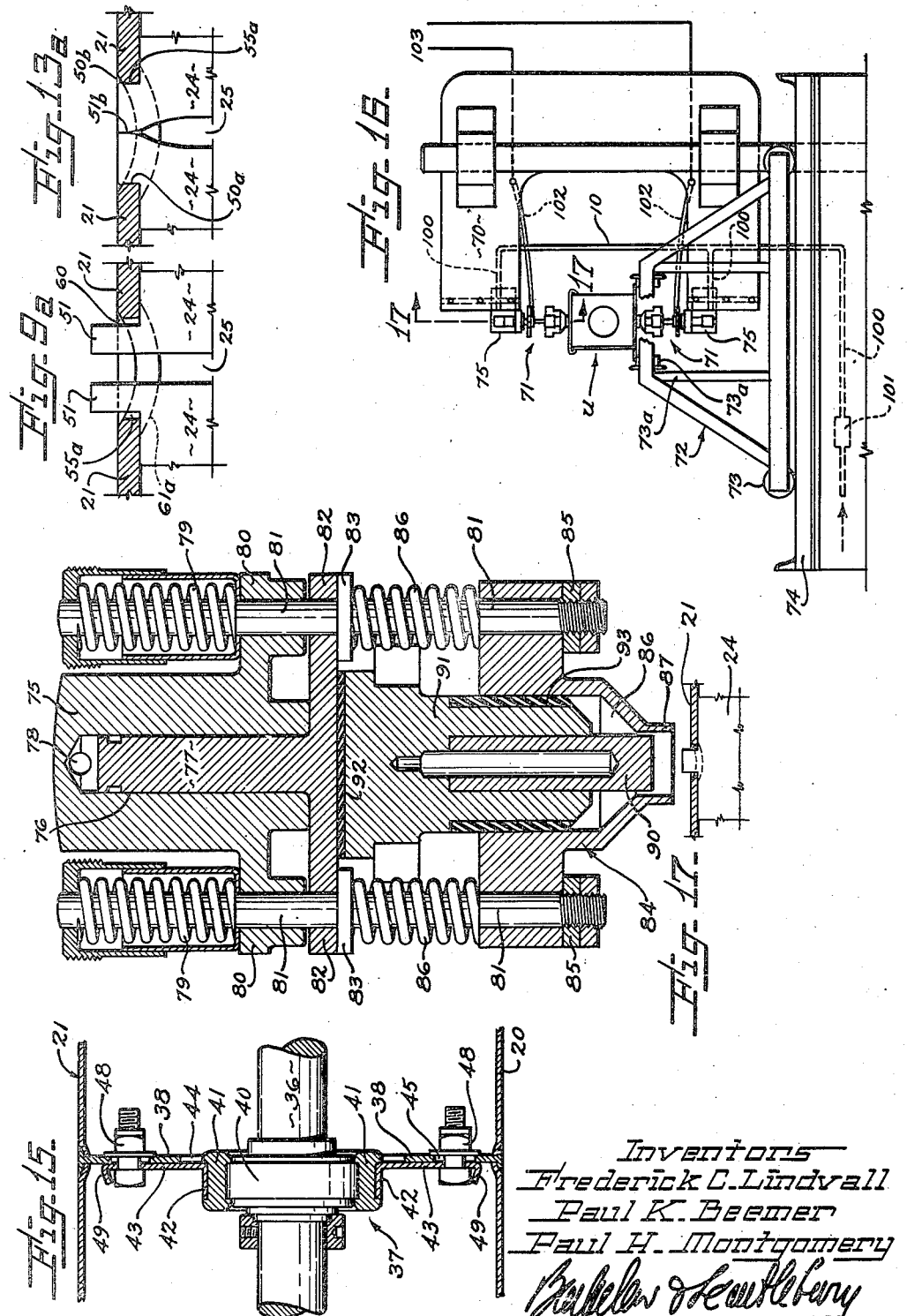

2,442,420

UNITED STATES PATENT OFFICE 2,442,420

AIR IMPELLER HOUSING

Frederick C. Lindvall, Altadena, and Paul K. Beemer, Inglewood, Calif., and Paul H. Montgomery, Chicago, Ill., assignors to Preco Incorporated, Los Angeles, Calif., a corporation of California Application September 4, 1945, Serial No. 614,220

10 Claims. (Cl. 230—133)

This invention relates to improvements in air impeller or fan housings and in methods of constructing them. The invention relates more particularly to the structure and fabrication of impeller housings of the general type shown in the Van Dorn Patent No. 2,349,315, May 23, 1944.

Impeller housings of that type embody an elongate box-like structure of sheet metal, with top and bottom walls and discontinuous or sectional side walls. The side wall sections along opposite sides are relatively staggered along the length of the box, and transverse partitions join the side wall sections in such manner as to form chambers which, proceeding along the length of the box, open out alternately to opposite sides of the box. The several partitions have central circular openings which are alined on a central longitudinal axis, and a single drive shaft extending through the box on that axis carries air propeller fans in alternate chambers, that is, in the chambers which open out to one side of the box.

Difficulties have been found in fabricating such a housing inexpensively and in providing a finished structure which at the same time is sufficiently strong and rigid to take the static loads and shock loads to which the structure is subjected in use, without distortions that will throw the shaft bearings out of alinement, those bearings being mounted on the structure. Previously it has been the practice to flange the various components and to weld them together either by manual arc or spot welding. That fabrication has provided for ample rigidity but has been relatively slow and expensive, due largely to the fact that the welding points have necessarily been located in different situations where no single and simple repetitive welding operation could be expeditiously applied.

It is one of the features of the present improvement that the entire operation of securing the component parts together involves nothing but the repetition of a simple operation applied only to the top and bottom faces of the structure. The securing points are easy to reach and the securing operation is very simple.

Another feature of the present improvements lies in the fact that the general design, and that of the securings, are such that fully welded connections are not necessary, connections of a forged riveted or headed type giving ample rigidity to the finished structure. Temperatures need not be as high as required for true welded connections and danger of burning the thin sheet metal is avoided. And a further feature is in the provision of mounting plates, for the shaft bearings, which are secured in the structure in the same manner as the transverse partitions and side walls, serve to further stiffen the structure, and require only repetitions of the same simple securing operation.

The features and characteristics of the invention will be best understood from the following detailed description of typical structures and procedures embodying the invention, reference for the purpose of such description being had to the accompanying drawings, in which Fig. 1 is a plan, with part of the top plate broken away, showing a housing structure typical of the invention;

Fig. 2 is an enlarged fragmentary plan of the structure shown in Fig. 1, without the top plate;

Fig. 3 is a plan of the corresponding portion of the top plate;

Fig. 4 is a vertical cross section taken as indicated by line 4—4 on Fig. 2, showing the top plate in place and the parts assembled ready for the securing operations;

Fig. 5 is a similar section on line 5—5 of Fig. 2;

Fig. 6 is a fragmentary plan-section of parts corresponding to those shown in Fig. 2 but showing the complete assembled impeller unit;

Fig. 7 is a cross section on line 7—7 of Fig. 6;

Fig. 8 is a cross section on line 8—8 of Fig. 6;

Fig. 9 is an enlarged detail section showing one unit of the securing means assembled ready for the final securing operation;

Fig. 9a is a similar view showing another unit of the securing means;

Fig. 10 is a section on line 10—10 of Fig. 9;

Fig. 11 is a plan of the parts shown in Figs. 9 and 10;

Fig. 12 is a bottom plan of the apertured part of a plate which forms one element of the securing unit of Figs. 9, 10 and 11;

Figs. 13 and 14 are sections similar to those of Figs. 9 and 10 but showing the parts as they appear after the final securing operation;

Fig. 13a is a view similar to that of Fig. 13, but showing the securing unit of Fig. 9a;

Fig. 15 is an enlarged vertical longitudinal section on line 15—15 of Fig. 7;

Fig. 16 is an end elevation of suitable apparatus on which the repeated securing operations are readily performed; and Fig. 17 is an enlarged detail section on line 17—17 of Fig. 16.

As shown illustratively in the drawings, the casing is composed mainly of a bottom plate 20, top plate 21, and vertical plate units 22 which provide both the sectional side wall units 23 and the transverse partition units 24. All these parts, and the bearing mounting plates 38, are composed of relatively thin sheet metal. To give an idea of relative dimensions, a housing about 96 inches long and with a transverse body dimension of about 8 inches, is constructed entirely of sheet metal 0.105 inch thick. As is seen in Figs. 1 and 2, the side wall sections and the transverse partitions make a formation, in plan, which may be described as being rectangularly sinuous. The formation is such that the several side wall sections 23 and partitions 24 may be formed of a single long sheet of metal bent to the desired conformation and provided with the apertures and tabs which will be described. And accordingly the several vertical plate units 22 may be considered as collectively forming one long sinuous unit which includes all of the side wall sections and the transverse partitions. However, we prefer to make up that long unit of a plurality of duplicated units, such as the units 22, because of the manufacturing complications involved in making the single long unit with the accuracy which is required of that unit to fit the other parts. The single long unit cannot be produced in one operation, whereas the small duplicated units can be simply produced by die pressing. This subdivision into short duplicate units also facilitates the provision of drainage openings, as will appear.

Accordingly, the side wall sections and partitions are provided by a series of units 22, each of which is rectangularly U-shaped in plan. These units are assembled in the configurations shown in Figs. 1 and 2, and in the final assembly are preferably separated by the slight vertical gaps shown at 25 in Fig. 2. While the several units might tightly abut at 25 at their meeting edges, slight gaps at those meeting edges provide convenient drainage escapes for water which might otherwise collect at one side of the casing. As shown in the issued patents previously referred to, these impeller casings extend transversely across the car floor, and unless some facility is provided for drainage of water past them, water from a car loading may bank up against one side of the casing. The provision of the drainage openings, easily provided by the gaps between unit 22, allows such water to pass the casing to find an outlet.

Although the several U-shaped wall units 22 may be full duplicates of each other, we prefer to make the units 22 which lie at one side of the casing a little wider than units 22a which lie at the opposite side of the casing. All units 22 are full duplicates and all units 22a are full duplicates. The resulting formation is such that the chambers 26 which are open at one side of the casing are somewhat wider than chambers 27 which open at the opposite side of the casing. The wider chambers 26 are the ones which take the impeller fans, as will be described.

As shown in the drawings, the complete sinuous wall unit, made up essentially of units 22 and 22a, also includes a pair of end units 22b which, instead of being U-shaped, are L-shaped, and are composed of a partition section 24 and a short side wall section 23a. The standard and duplicated unit 22 and 22a, are made up of a side wall section 23 and of two partition half sections 24. Each partition, when the parts are assembled, is thus made up of two half sections. Each partition has in it a circular opening made up of two semi-circular openings 30 which are formed in the two half sections 24. This circular opening is flanged at 31 to stiffen the partition members, and to provide smooth and efficient air flow through the opening into the center of the fan.

To make the structure of Figs. 1, 2, etc. more intelligible, we refer now to Figs. 6, 7 and 8, which show the structure and arrangement of the complete finished impeller unit. As shown in those figures, the wider chambers 26 accommodate impeller fans of the radial blade type, such as shown at 35. These fan units are set on their single longitudinal shaft 36 which extends centrally longitudinally of the housing structure and is mounted in bearings 37 which are carried on vertical bearing plates 38 located in some of the narrower chambers 27 and, in one instance, located in the end space within one of the end units 23b (see the right hand end of Figs. 1 and 6). These bearing plates 38 are mounted on and assembled with top and bottom plates 21 and 20 in the same manner that units 22 are assembled with those plates, so that the bearing plates become a rigid part of the finished structure, help to stiffen it, and maintain a rigid relation to the partition walls of the structure and to each other. The bearing plates are shown in Figs. 4 and 7, and Figs. 6, 7, and 15 show the mountings of the bearings 37 on those plates. The bearings proper are shown as ball bearings 40 mounted on shaft 36. The outer members of these bearings 40 are mounted in internally grooved rubber rings 41 which have external grooves fitting interiorly into a flange 42 of a bearing base plate 43. Each bearing mounting plate 38 is provided with a central opening 44 of sufficient size to accommodate ring 41 with clearance, and each plate 38 is also provided with a pair of slotted bolt openings 45 which are elongate in one direction, say vertically. Each bearing base plate 43 is provided with registering bolt holes 46 which are elongated horizontally. The arrangement provides for easy adjustment of all the bearings 37 in axial alinement on the finished and rigid housing structure, the bolts 48 being set up when that alinement has been adjusted. Ears 49 are turned down against the bolt heads before setting up the nuts, and the latter are locked with an ordinary lock washer. When finally set in position, the several bearings are rigidly secured to their several mounting plates 38. And, as will be seen, our invention provides a structure in which the several bearing plates 38 are rigidly maintained in alinement with each other and in alinement with the other parts of the structure. Freedom of the bearings for angular alinement is allowed by the rubber rings 41.

The narrower chambers 27, in some of which the plates 38 are mounted, provide the chambers or passages by which air enters the casing from one side, the air then passing through the partition openings 30 endwise into the impeller fans, and then being thrown out at the opposite side of the casing by the rotary action of the impeller fans.

Going back now to Figs. 1, 2 and 3 we will explain how the various wall units of the casing, and the bearing plates 38, are assembled and secured in a rigid assembly. Each unit 22 is provided, along its top and bottom edges, with a series of spaced, projecting, rectangular tabs 50, arranged in plan as is best shown in Fig. 2. At the edges which meet or form the gaps at 25, each of the units is provided, on the top and bottom edges of its partition sections 24, with projecting tabs 51 which are only half the width of tabs 50, or preferably somewhat less than half width. The special end units 22b are provided with similar tabs 50 and 51. The tabs 50 and 51 on all units 22 are duplicates as to size and arrangement, and the same is true of all the tabs on unit 22a. In the assembled formation shown in Figs. 1 and 2, the several projecting tabs of all the assembled units form a certain definite pattern at both the top and bottom edges of the assembled units.

Bearing mounting plates 38 are provided at their top and bottom edges with the same spaced tabs 50, and these tabs, in the final assembly, bear a definite pattern relationship in plan to the pattern of the other tabs.

Both the bottom and top plates 20 and 21 are provided with perforations 55 arranged on the assembly pattern of tabs 50 and 51 and thus adapted to take and pass the several tabs 50 and 51 when the parts are assembled. Perforations 55 are all of duplicate size, a little larger than the cross-sectional size of tabs 50. This includes the perforations 55a each of which take a pair of the half-sized tabs 51. Fig. 3 may be understood to show the pattern arrangement of the perforations in both bottom and top plates 20 and 21.

Figs. 9 to 12 show in enlarged detail the preferred formation of the tabs and perforations and their relationship to each other when initially assembled and ready for the securing operations. These figures show a plate, for instance the half portion plate 24 with a tab 50 projecting through an opening 55 in top plate 21. The illustrations are however typical of all tabs 50 and their receiving perforations. The special openings 55a which take the half tabs 51 are shown in Fig. 9a in their initially assembled positions, and in Fig. 13a in their finally secured conditions.

As shown in Figs. 9 to 12, the top plate 21 (and likewise bottom plate 20) is exteriorly recessed around each opening 55, preferably with a recess 60 which is circular in plan. The diameter of this external recess is preferably slightly larger than the length dimension of opening 55. The recess is formed by pressing the sheet metal inwardly, in the same die pressing operation by which openings 55 are formed. The recessing operation of course results in a corresponding convex protuberance 61 on the inner face of the sheet metal plate 20 or 21, which protuberance has a diameter somewhat larger than the length dimension of perforation slot 55. And, in order to allow the edges 62 of the vertical plates 23, 24, etc. to lie directly against the inner faces of the top and bottom plates, the areas at 63 on the inner faces of the top and bottom plates which would otherwise project slightly inward of those inner faces, are left flat in the same die-pressing operation to be flush with those inner faces. The resulting inner face formation is shown in Fig. 12 where the perforation slot 55 is shown to have a less than semi-circular bulge at each of its longitudinal edges, but no bulge exists at its end edges.

As a result of the described formation, the upper and lower edges of all the vertical plates or sheets are allowed to abut the inner faces of the top and bottom sheets, and the opposed straight edges 61a of the bulges 61 overhang the edges of the vertical sheets on each side. Tabs 50 project through the openings 55 and upwardly through and beyond the recesses 60. Proportionate dimensions which have been found suitable and practicable for the assembly are shown in the enlarged detail figures, although of course the invention is not to be limited to the particular proportions illustrated.

Fig. 9a shows how the semi-tabs 51 fit into and through the perforations 55a, which are identical with, and recessed in the same manner, as perforations 55. When the parts are initially assembled they are as shown in Fig. 9a, preferably with the gap 25 existing between the two partition sections 24, and between the two semi-tabs 51. The dimensioning of all the parts is such that, although perforations 55 are all somewhat larger than the tabs 50 and thus allow some looseness when the parts are initially assembled, the gap at 25 is wide enough that it will still exist as a gap even if two parts 24 happen to be moved toward each other as far as the looseness will allow.

The several components of the whole casing assembly are easily initially assembled by first laying down the top or bottom plate on a skeleton or lattice support, and then placing the several units 22, 22a, 22b and 38 in their indicated assembly positions with all of their lower tabs projecting downwardly through the corresponding perforations. Then the other, top or bottom, plate is placed on top the assembled vertical units and by slight adjustment of the parts all of the upper tabs are passed through the perforations in the plate which is placed on top. Such a condition of assembly is indicated in Figs. 1 and 2 and is shown in the sectional views of Figs. 4 and 5. The whole assembly is then ready for the final securing operations which secure all of the various parts into one rigid structure.

In their initially assembled condition, each tab 50 or 51 which projects through top plate 21 has a counter-part tab directly vertically opposite it projecting through bottom plate 20. Figs. 4 and 5 for instance show how the tabs 50 and 51 on vertical units 24 and 38 are arranged opposite each other at the top and bottom edges of those units. And, as stated, the patterns of perforations in the top and bottom plate are the same. Consequently each tab which projects above the upper surface of the initially assembled structure has a corresponding tab directly opposite it projecting from the lower surface of the initially assembled structure; and that arrangement greatly facilitates the final securing operations. And all of these opposed pairs of tabs are substantial duplicates of each other, the only difference being that the special tabs 51 are, in effect, two parts which together make up a composite tab which is substantially like a tab 50. That substantial duplication which exists throughout all of the tab sets, and the fact that all of the pairs of tabs have a common positional relation to the whole assembly, make it possible to perform the final securement by simple repetition of a simple securing operation.

Generally described, the final securing operation consists in simultaneously and oppositely pressing and heating each pair of projecting tabs. A suitable apparatus for performing the operation is shown in Figs. 16 and 17. A doubleheaded apparatus of the electric welding type is provided, that apparatus being here illustrated as having a U-frame 70 and two oppositely disposed operating heads 71 mounted in the frame one above the other. A carriage 72 is provided to carry the initially assembled unit which is designated by the letter U in Fig. 16 and shown to be supported in position between the two heads 71. Carriage 72 is mounted on rollers 73 on a suitable base 74 in such a manner that the carriage can be moved transversely of its length and of the length of unit U; and the unit U is movable longitudinally of its length (normal to the plane of the drawing in Fig. 16) by sliding along the length of the carriage or by moving on transverse rollers 73a with which the carriage may be supplied. The arrangement has the result of allowing unit U to be easily moved either longitudinally or transversely with relation to the opposed heads 71, and of being constantly maintained in such orientation that when any upper projecting tab is brought under upper unit 71, the lower corresponding and opposite tab will be brought directly over the lower unit 71. With a pair of tabs in such positions, the two units 71 are operated simultaneously to perform the final securing operation on that pair of tabs.

Details of a suitable operating head for performing the securing operation are shown in Fig. 17. As there shown, the head includes a relatively stationary member 75 which has in it a cylinder 76 taking a plunger 77. Plunger 77 is moved longitudinally (downwardly in Fig. 17) by admission of fluid pressure at 78. A pair of springs 79, seated upon lugs 80 which project from member 75, and acting on vertical studs 81 which move with plunger 77, are adapted to return the plunger to the normal position shown in Fig. 17 when the fluid pressure is relieved. Studs 81 are connected with ears 82 which are formed as extensions of plunger 77. The studs are connected to ears 82 in such a manner that the studs cannot move upwardly with relation to plunger 77 as for instance by having collars 83 under ears 82.

Studs 81 project downwardly below collars 83 and at their lower ends they carry a presser foot member 84 slidable upon them. The presser foot member is supported by nuts 85 at the lower ends of studs 81 and is pressed down on the studs by a pair of springs 86 confined between foot member 84 and collars 83. The presser foot has a central vertical opening 86 and has a lower annular foot 87 which is adapted to seat on the work with a pressure which is determined by the strength of springs 86. When plunger 77 moves down, foot 87 moves down with it until the foot seats on the work, and then further downward movement of the plunger applies the pressure of springs 86 to the work.

A cylindric electrode 90 is carried in an adapter 91 which is mounted on the lower face of plunger 77 with interposed insulation 92. An insulating sleeve 93 also surrounds adapter 91 where it passes into and through opening 86 in foot member 84.

In the normal position of the parts electrode 90 lies with its end somewhat inward of the end of foot 87. When pressure is applied to plunger 77 the first operation is to move foot 87 into contact with the work under the pressure of springs 86. During further movement of plunger 77, and as electrode 90 is moved into contact with a tab, the presser foot is maintained against the work under the spring pressure. That foot pressure is thus maintained constant while the pressure which may be applied directly to the electrode and to the tab depends upon the fluid pressure which is applied to plunger 77. That electrode pressure is sufficient to press and forge the tab when the tab is heated to a suitable temperature by the applied current.

The preferred relationship of size, between a tab and its surrounding recess, and pressure foot 87 and electrode 90, is indicated in Fig. 17. As there shown, the internal diameter of annular foot 87 is larger than the diameter of the recess 60, and the diameter of heating and pressing electrode 90 is also preferably somewhat larger than the recessed diameter, so that the electrode may finally seat on the normal flat surface of the top or bottom plate of the assembled structure at the end of a securing operation rather than seat in the recess 60. With this provision the tabs can be forged down and flattened to a condition flush with the outer surfaces of the plates, but the head which is formed on the tab cannot easily be reduced in thickness to a dimension less than that which is determined by the depth of recess 60.

The two operating heads 71 are duplicates and are operated simultaneously to apply their pressure feet oppositely to the assembly, and to apply their electrodes simultaneously and under equal pressures to the two opposite tabs of a set. When the electrodes are thus applied the heating current flows in series from one electrode through its contacted tab, and then through the immediately associated plate and the assembled structure in general, to and through the other contacted tab and the other electrode. The heating current and forging pressures are thus applied simultaneously to the two opposed tabs of a pair. Fig. 16 shows, merely diagrammatically, a piping system 100 for applying fluid pressure simultaneously to both heads 75 under control of a single valve which is indicated at 101; and also shows diagrammatically the connector strips 102 which connect severally with the electrode adapters 91, and the circuit 103 in which the connectors 102 and the electrodes 90 are connected in series. In an actual practical embodiment of the apparatus, the arrangements are such that foot valve 101 can first be operated to apply the fluid pressure to the heads to first bring feet 87 into opposing contact with the work, and then move the electrodes into pressure contact with the work. Further actuation of the foot device then initiates the electric heating cycle. The electrical circuiting and control are such that the heating current is not applied, to the circuit until the circuit is first closed by the electrode making initial contact with the tabs, and the current is then automatically cut off after a time period sufficient for the heating and forging operation to be completed. Such details however need no illustration or description here, as they form no part of our present invention. In fact we make no claim here to the apparatus of Figs. 16 and 17 in and of itself, only making claim to it as a part of certain method combinations and as involving means for performing the operations which are described.

The finished securings are illustrated in Figs. 13, 14 and 13a. Figs. 13 and 14 show the finished headed form which is taken by a tab 50, and Fig. 13a shows the finished headed form taken by a pair of semi-tabs 51. As shown in Figs. 13 and 14 the heated tab expands transversely in both planes, expanding so as to fill the length of perforation 55 at least in the outer part of the perforation. This expansion is illustrated in Fig. 13 at 50a. The outermost part of the tab also expands in the same direction to form at least a slight heading at 50b beyond the ends of perforation 55. In the direction crosswise of perforation 55 the tab expands laterally, as indicated at 50c to fill at least the outer part of opening 55. That expansion may extend inwardly of plate edge 62 to fill more of the aperture, but not necessarily so. And outside of the aperture 55, in the recess 60, the tab expands laterally to form a considerable head as shown at 50d. It is not necessary that the heating current be large enough and the temperature be carried high enough to cause welding to take place between the parts which are forced into heated contact. By carrying the temperatures sufficiently high, welding may take place to some extent, after the tabs have been expanded into contact with the plate. But such welding is not necessary. It is sufficient that the tabs be forged into rivet-like heads which completely and tightly fill the apertures and which head tightly over the external surface of the plate. The plate is then held in solid and tight engagement with the edge of the wall member, such as 24; and when this tight-holding securement has been performed for all of the several sets of tabs on the longitudinal side walls and the transverse partition walls and the transverse bearing mounting plates, the whole structure is then so rigidly interconnected that, although it is entirely made of relatively thin sheet metal, it is virtually an integrated structure which is exceptionally rigid under all the loads and thrusts to which it may be subjected.

The final form taken by the tabs 51 at gap 25 in partition plate 24, is shown in Fig. 13a. A transverse section, like that of Fig. 14, of the final form of this tab, would be a duplicate of the showing of Fig. 14. And in the aspect of Fig. 13a the final form is the same as that shown in Fig. 13, and the same numerals are applied, except that the outer parts of the two half tabs are forced together at 51b, and may be partially welded there or are at least integrated, so that the resultant integrated whole head is in all essentials like that shown in Fig. 13. To provide the metal for forming the juncture at 51b, the tabs 51 may initially be a little higher than tabs 50; but those tabs 51 are in practice made of the same height as tabs 50, and the metal for forming that juncture is taken from the lateral overhang of the head (shown in Fig. 14) so that that lateral overhang in the case of tabs 51 may be slightly less than it is for tabs 50.

We claim:

1. An air impeller casing composed of sheet metal, comprising an elongate lower wall plate, an elongate upper wall plate, an intervening vertical wall plate unit contacting the lower and upper plates at its lower and upper edges, said vertical wall unit having a configuration in plan which is substantially rectangularly sinuous and extending longitudinally of the lower and upper plates, and said vertical wall unit forming a series of longitudinally arranged chambers between the lower and upper plates which chambers alternately have open sides at opposite sides of the casing, and a series of substantially identic securing units spaced along the upper and lower edges of the sinuous vertical wall plate unit, each of the substantially identic securing units comprising an integral tab projecting from the edge of the vertical plate through the upper or lower plate and headed over the external surface of that plate.

2. An air impeller casing composed of sheet metal, comprising an elongate lower wall plate, an elongate upper wall plate, an intervening vertical wall plate unit contacting the lower and upper plates at its lower and upper edges, said vertical wall unit having a configuration in plan which is substantially rectangularly sinuous and extending longitudinally of the lower and upper plates, and having alternating side wall sections and longitudinally spaced transverse partition sections connecting side wall sections at opposite sides of the casing, and a series of substantially identic securing units spaced along the upper and lower edges of the side wall sections and the partition sections, each of the substantially identic securing units comprising an integral tab projecting from the edge of the vertical wall unit through the upper or lower plate and headed over the external surface of that plate.

3. An air impeller casing composed of sheet metal, comprising an elongate lower wall plate, an elongate upper wall plate, an intervening vertical wall plate unit contacting the lower and upper plates at its lower and upper edges, said vertical wall unit having a configuration in plan which is substantially rectangularly sinuous and extending longitudinally of the lower and upper plates, and having alternating side wall sections and longitudinally spaced transverse partition sections connecting side wall sections at opposite sides of the casing, and a series of substantially identic securing units spaced along the upper and lower edges of the side wall sections and the partition sections, each of the substantially identic securing units comprising an integral tab projecting from the edge of the vertical wall unit through an aperture in the adjacent plate, the plate being externally recessed about the aperture and having internal recess bulges which lie at opposite sides of the plate edge, and the tab being headed over the external surface of the plate in the recess.

4. An impeller casing composed of sheet metal, comprising an elongate lower wall plate, an elongate upper wall plate, an intervening vertical wall plate unit contacting the lower and upper plates at its lower and upper edges, said vertical wall unit having a configuration in plan which is substantially rectangularly sinuous and extending longitudinally of the lower and upper plates, and having alternating side wall sections and longitudinally spaced transverse partition sections connecting side wall sections at opposite sides of the casing, a plurality of transverse vertical bearing supporting plates arranged in some of the spaces between adjacent transverse partition sections, said bearing supporting plates having their upper and lower edges in contact with the upper and lower plates, and a series of substantially identic securing units spaced along the upper and lower edges of the bearing supporting plates and the side wall sections and the partition sections, each of the substantially identic securing units comprising an integral tab projecting from the edge of the vertical wall unit through the upper or lower plate and headed over the external surface of that plate.

5. An air impeller casing composed of sheet metal, comprising an elongate lower wall plate, an elongate upper wall plate, an intervening vertical wall plate unit contacting the lower and upper plates at its lower and upper edges, said vertical wall unit having a configuration in plan which is substantially rectangularly sinuous and extending longitudinally of the lower and upper plates, and having alternating side wall sections and longitudinally spaced transverse partition sections connecting side wall sections at opposite sides of the casing, a plurality of transverse vertical bearing supporting plates arranged in some of the spaces between adjacent transverse partition sections, said bearing supporting plates having their upper and lower edges in contact with the upper and lower plates, and a series of substantially identic securing units spaced along the upper and lower edges of the bearing supporting plates and the side wall sections and the partition sections, each of the substantially identic securing units comprising an integral tab projecting from the edge of the vertical wall unit through an aperture in the adjacent plate, the plate being externally recessed about the aperture and having internal recess bulges which lie at opposite sides of the plate edge, and the tab being headed over the external surface of the plate in the recess.

6. An air impeller casing composed of sheet metal, comprising an elongate lower wall plate, an elongate upper wall plate, an intervening vertical wall plate unit contacting the lower and upper plates at its lower and upper edges, said vertical wall unit having a configuration in plan which is substantially rectangularly sinuous and being composed of a plurality of substantially identic sub-units mutually spaced at their adjacent edges to provide drainage passages, and a series of substantially identic securing units spaced along the upper and lower edges of the sinuous vertical wall plate unit, each of the substantially identic securing units comprising an integral tab projecting from the edge of the vertical plate through the upper or lower plate and headed over the external surface of that plate.

7. An air impeller casing composed of sheet metal, comprising an elongate lower wall plate, an elongate upper wall plate, an intervening vertical wall plate unit contacting the lower and upper plates at its lower and upper edges, said vertical wall unit having a configuration in plan which is substantially rectangularly sinuous and being composed of a plurality of substantially identic sub-units arranged in substantially abutting relation at their adjacent edges, and a series of substantially identic securing units spaced along the upper and lower edges of the sinuous vertical wall plate unit, each of the substantially identic securing units comprising an integral tab projecting from the edge of the vertical plate through the upper or lower plate and headed over the external surface of that plate.

8. An air impeller casing as defined in claim 1, and in which the upper and lower securing units on the vertical wall plate unit are arranged in vertically opposite pairs.

9. An air impeller casing as defined in claim 6, and in which the upper and lower securing units on the vertical wall plate unit are arranged in vertically opposite pairs.

10. An air impeller casing as defined in claim 7, and in which the upper and lower securing units on the vertical wall plate unit are arranged in vertically opposite pairs.

FREDERICK C. LINDVALL.
PAUL K. BEEMER.
PAUL H. MONTGOMERY.

REFERENCES CITED

The following references are of record in the file of this patent:

UNITED STATES PATENTS

| Number | Name | Date |
|---|---|---|
| 1,484,579 | Still | Feb. 19, 1924 |
| 2,157,441 | Sullivan | May 9, 1939 |
| 2,231,063 | Evans | Feb. 11, 1941 |
| 2,264,897 | Becker et al. | Dec. 2, 1941 |
| 2,393,720 | Swanson | Jan. 29, 1946 |

FOREIGN PATENTS

| Number | Country | Date |
|---|---|---|
| 450,322 | France | Jan. 16, 1913 |